United States Patent
Raad et al.

(10) Patent No.: US 8,303,312 B2
(45) Date of Patent: Nov. 6, 2012

(54) HIGH VOLTAGE SUBSEA ELECTRICAL PENETRATOR

(75) Inventors: Erik Raad, Oslo (NO); Rune Sletten, Nesoddtangen (NO)

(73) Assignee: Veteo Gray Scandinavia AS, Sandvika (NO)

( * ) Notice: Subject to any disclaimer, the term of this patent is extended or adjusted under 35 U.S.C. 154(b) by 0 days.

(21) Appl. No.: 13/140,574

(22) PCT Filed: Dec. 18, 2009

(86) PCT No.: PCT/IB2009/007831
§ 371 (c)(1),
(2), (4) Date: Jun. 17, 2011

(87) PCT Pub. No.: WO2010/070439
PCT Pub. Date: Jun. 24, 2010

(65) Prior Publication Data
US 2011/0250774 A1    Oct. 13, 2011

(30) Foreign Application Priority Data
Dec. 18, 2008   (NO) .................................. 20085312

(51) Int. Cl.
*H01H 41/00*   (2006.01)
(52) U.S. Cl. ........................................................... 439/8
(58) Field of Classification Search .................. 439/6, 8
See application file for complete search history.

(56) References Cited

U.S. PATENT DOCUMENTS

| | | | | |
|---|---|---|---|---|
| 3,012,798 A | * | 12/1961 | Berger | 285/264 |
| 3,328,741 A | * | 6/1967 | Brown | 439/8 |
| 4,679,875 A | | 7/1987 | Ramsey | |
| 5,018,980 A | * | 5/1991 | Robb | 439/8 |
| 7,810,985 B2 | * | 10/2010 | Chien | 362/641 |
| 7,896,654 B2 | * | 3/2011 | Zheng | 439/8 |
| 2011/0081788 A1 | * | 4/2011 | Robb | 439/8 |

FOREIGN PATENT DOCUMENTS

| | | |
|---|---|---|
| GB | 2440183 A | 1/2008 |
| RU | 2050651 C1 | 12/1995 |
| RU | 2064213 C1 | 7/1996 |
| WO | WO-2007/096760 A1 | 8/2007 |

OTHER PUBLICATIONS

PCT/ISA/210—International Search Report—Apr. 14, 2010.
PCT/IPEA/409—International Preliminary Report on Patentability—Nov. 3, 2010.
Norwegian Search Report—May 20, 2009.

* cited by examiner

*Primary Examiner* — Neil Abrams
*Assistant Examiner* — Phuongchi Nguyen
(74) *Attorney, Agent, or Firm* — Venable LLP; Eric J. Franklin

(57) ABSTRACT

A high voltage subsea electrical penetrator. A first housing part is connectable to a second housing part. The first and second housing parts in connected mode define a seat for accommodation of a bushing including a conductor pin arranged in an insulator body. The first and second housing parts each have a part-spherical seat surface supporting a corresponding region of the bushing. The bushing includes a material of relatively high compressive strength, in the form of a polymeric material or a ceramic material, that is molded into spherical outer shape about a bulbous portion of the conductor pin, and clamped as a unitary form-fitting element in the seat upon connection of the first and second housing parts.

20 Claims, 3 Drawing Sheets

HIGH VOLTAGE SUBSEA ELECTRICAL PENETRATOR

CROSS-REFERENCE TO RELATED APPLICATIONS

This application claims priority under 35 U.S.C. §119 to Norwegian patent application 20085312 and is the national phase under 35 U.S.C. §371 of PCT/EP2009/007831 filed 18 Dec. 2009.

TECHNICAL FIELD OF THE INVENTION

The present invention relates to a high voltage subsea electrical penetrator having a bushing, the bushing comprising a conductor pin embedded in an insulator body and arranged to be mounted in a penetrator housing.

BACKGROUND AND PRIOR ART

In subsea production, electrically operated apparatuses below sea level are typically supplied by power from sea- or land-based host facilities. Operating power, in this connection typically at voltages of 1 kV and above, is conducted via cable conductors to submerged process control equipment, pumps and compressors, transformers, motors, and other electrically operated equipment, and is introduced to encapsulated power consumers by means of a cable termination and connector, in this specification referred to as a high voltage electrical penetrator.

An electrical penetrator for subsea purpose is previously known from WO 2007/096760 A1. This known electrical penetrator accommodates cable termination components by which a cable conductor is electrically connected to a conductor pin that is accessible from a connector end of the electrical penetrator. The conductor pin is fixedly embedded by moulding into a synthetic resin insulator body, which is seated in a penetrator housing and is sealed against the penetrator housing by means of O-rings, or other types of seals.

In submerged applications it is for several reasons indispensable that the electrical penetrator is protected from the ingress of water. Considerable pressures prevailing at operational water depths down to and below 1,000 m, e.g., requires a penetrator structure that is adapted to existing ambient pressures and differential pressures over seals, the bushing and other structures included in the electrical penetrator.

Differential pressures applied to the electrical penetrator from surrounding sea and from a pressurized device enclosure thus strive to displace the bushing relative to the penetrator housing. In the cited known electrical penetrator, pressure induced displacement of the bushing is prevented through a slanting radial shoulder on the exterior of the insulator body receiving abutting support from a corresponding inner shoulder on the penetrator housing. At higher pressures, the angular transitions into the slanting surfaces on the insulator body and on the penetrator housing respectively however induces local tensile and shear stresses in the insulator body material, and sets a limit for allowable nominal and differential pressures over the bushing. In practise, the cited previously known electrical penetrators having synthetic material insulator bodies are for security reasons qualified for operation at pressures of 200 bars in one direction and 100 bars in the opposite direction. Other penetrator designs having ceramic or glass insulator bodies may be structured to withstand higher pressures, but suffer from a more complex production and associated higher production costs.

An electrical penetrator for subsea application is previously known from RU 2050651 C1. A bulbous portion of a conductor element is embedded in elastomeric polymer material which is injection moulded into a cavity that is formed between the conductor element and a spherical seat of a penetrator housing which surrounds the conductor element. Albeit the structure of the device disclosed in RU 2050651 C1 is readable on the preamble of claim 1 of the present invention, it is acknowledged that the device disclosed in RU 2050651 C1 is however less suitable for the purpose of conducting electric current at high voltages where high differential pressures are prevailing, due to the limited yield strength of an elastomeric material and due to the limited thickness of the injection moulded polymer insulation which is available through the dimension of the gap that is formed between the conductor element and its seat.

SUMMARY OF THE INVENTION

The object is accomplished in a subsea electrical penetrator comprising a penetrator housing and bushing as specified in the claims.

A high voltage subsea electrical penetrator is thus disclosed, comprising a first housing part which is connectable to a second housing part. The first and second housing parts are arranged in connected mode to define a seat for accommodation of a bushing comprising a conductor pin arranged in an insulator body. The first and second housing parts each having a part-spherical seat surface supporting a corresponding region formed on the bushing. In accordance with the present invention, the bushing comprises a material of relatively high compressive strength, in the form of a polymeric material or a ceramic material, which is moulded into spherical outer shape about a bulbous portion of the conductor pin, and clamped as a unitary form-fitting element in the seat upon connection of the first and second housing parts.

The resulting polymeric or ceramic body produces a hard and sustaining shell about the bulbous portion of the conductor pin, which seals to the conductor pin through bonding between the inner surface of the shell and the outer surface of the conductor pin. The outer spherical surface of the shell provides a form fit and a permanent seal with the inner surface or seat of the penetrator housing, when the insulator body and conductor pin are together clamped as a unitary form-fitting element between the housing parts upon assembly. Through this measure a subsea high voltage electrical penetrator is provided which can operate at substantially increased ambient and differential pressure ranges.

It is preferred that the first and second housing parts are assembled through a threaded connection, by which the so formed spherical bushing is clamped in the seat under a controllable bias from the first and second housing parts.

The insulator body produced by moulding about the conductor pin comprises a substantially continuous spherical shell having a wall thickness of about 5-15 mm, preferably a wall thickness of at least about 8-12 mm, which is penetrated by the projecting ends of the conductor pin.

Significantly, sealing against ingress of liquid and/or gas at the interface between the insulator body and the conductor pin is accomplished by bonding upon moulding the spherical shell about the conductor pin. Sealing at the interface between the spherical bushing and penetrator housing is accomplished through form fitting the isolator body into the seat surfaces of the penetrator housing parts. In addition, a seal element, such as an O-ring, may be seated in the wall of the penetrator housing. A ring-shaped seal element may thus be recessed into the part-spherical seat surface of the first and/or the second housing part.

In one advantageous embodiment, the spherical bushing is ground into a perfect form fit with the seat surfaces of the first and second housing parts through a rotary grinding procedure in situ.

A coating, such as silver or PTFE, may advantageously be applied externally on the spherical bushing, and/or to the seat surfaces.

In preferred embodiments, the shape of the spherical bushing is one of an egg-shape, a spheroid, a substantially true sphere, and a true sphere.

In a most preferred embodiment, the shape of the spherical bushing is axially symmetric with respect to a longitudinal axis through the spherical bushing.

It is also preferred that the seat surfaces on the first and second housing parts are symmetrically arranged with respect to the longitudinal axis.

In addition, the seat surfaces on the first and second housing parts are preferably symmetrically arranged also with respect to a mass centre of the spherical bushing.

The symmetry of design of the seat and the spherical bushing in preferred embodiments provides the advantages of even load distribution and equal capacity to withstand differential pressures in both axial directions.

In preferred embodiments, the seat surfaces of the first and second housing parts are essentially ring-shaped, and each circular edge, defining an area of contact between the spherical bushing and the seat, comprises a relief region.

Said relief region comprises a radius transition between contacting and non-contacting portions of the seat, by which the contact interference between the seat and the spherical bushing is gradually decreased.

It is further preferred that the insulator body is moulded about a bulbous portion arranged on the conductor pin, from which portion at least two conductor pin ends project through the insulator body material for electrical connection to a cable conductor and to a mating contact device respectively. The shape of the bulbous portion on the conductor pin is preferably the down-sized outer shape of the insulator body.

The preferred geometries and resulting load case provides maximum utilization of material properties in the insulator body. Simplicity of geometric shape also provides ease of manufacture. Advantageously, the insulator body is moulded from a polymeric material, and preferably from a thermosetting or thermoplastic material. In alternative to glass and ceramics including glass/glass-ceramics, the choice of polymeric material in the insulator body further promotes low manufacturing costs.

In preferred embodiments, the insulator body comprises a spherical shell made of epoxy, or a spherical shell made of PEEK (polyetheretherketone).

In one embodiment the subsea electrical penetrator is provided a generally axial configuration, wherein two conductor pin ends project at mutually opposite directions from the insulator body, coincident with the longitudinal axis through the spherical bushing.

In this embodiment, the penetrator housing has a connector end arranged for connection to a mating contact device, and an opposite cable termination end which is arranged for accommodation of components which are customary involved in the termination of cable conductors in high voltage subsea electrical penetrators.

However, other embodiments can be realized and made possible through the suggested geometry of the insulator body. In one alternative embodiment the subsea electrical penetrator is provided a non-axial or angular configuration, wherein at least one conductor pin end projects from the insulator body at an angle relative to the longitudinal axis, while at least one conductor pin end is coincident with the longitudinal axis. The angled conductor pin end or ends may be arranged to extend at different angles relative to the penetrator axis, such as within 30-150° from the longitudinal axis, e.g. In a most preferred angular configuration, the at least one angled conductor pin end is arranged to project in a radial plane at 90° angle relative to the longitudinal axis. The angled conductor pin end or ends may be arranged to project in a radial plane which passes a mass centre of the insulator body.

In such embodiments, the penetrator housing comprises the connector end and at least one cable termination end comprising a conductor pin passage extending from the seat at an angle relative to the longitudinal axis of the penetrator housing.

In one embodiment of the subsea electrical penetrator arranged for power distribution to a plurality of power consumers, one conductor pin end is coincident with the penetrator axis whereas a plurality of conductor pin ends are arranged to project from the insulator body at an angle relative to the penetrator axis. The plurality of conductor pin ends may be arranged in a common radial plane, and may also be equidistantly spaced in the common radial plane.

In such embodiments, the penetrator housing comprises the connector end and a plurality of cable termination ends comprising a plurality of passages extending at an angle relative to the longitudinal axis. One penetrator housing part thus comprises connections for a corresponding plurality of supplementary housing parts accommodating the cable termination components included in a distributor subsea penetrator.

SHORT DESCRIPTION OF THE DRAWINGS

The invention is further explained below with reference to the drawings wherein embodiments of the subsea electrical penetrator and bushing are schematically illustrated. In the drawings, FIG. 1 is a sectional view through a first embodiment of the subsea electrical penetrator and bushing;

DETAILED DESCRIPTION OF EXAMPLES AND PREFERRED EMBODIMENTS OF THE INVENTION

In the following specification, the expression spherical shall be understood in a broader sense to include rotationally symmetric rounded shapes such as egg-shapes, spheroids, substantially true spheres and true spheres, all of which have a rounded shape in this case for the purpose of substantially avoiding or limiting tensile stresses caused by body shape and/or body distortion under load. The expression part-spherical shall be understood as referring to a region of such a spherical shape, such as a semi-spherical region, or a continuous or non-continuous ring-shaped region of a sphere.

It need not be a requisite to benefit from the invention, but considered a most advantageous case, when the spherical shapes of the insulator body and seat surfaces of the present invention are formed axially symmetric with respect to a longitudinal axis. The expression axially symmetric shall in this connection be understood to specify a condition wherein a forward half of the insulator body is the mirrored image of a rearward half of the insulator body, and in correspondence herewith, the condition wherein a forward seat surface is the mirrored image of a rearward seat surface.

Figure 1:
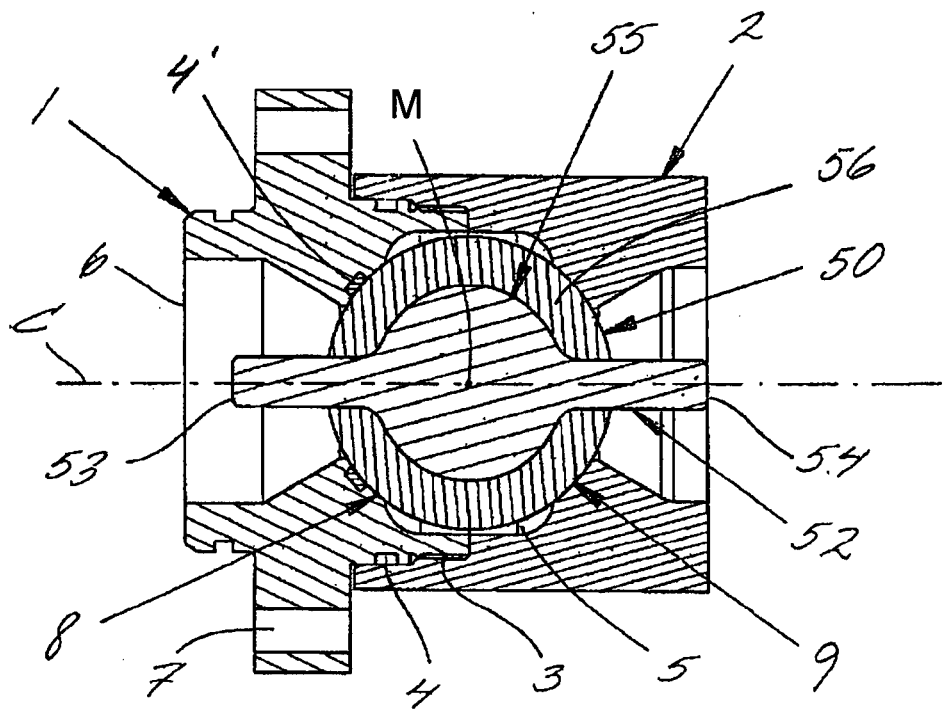
Figure 2:
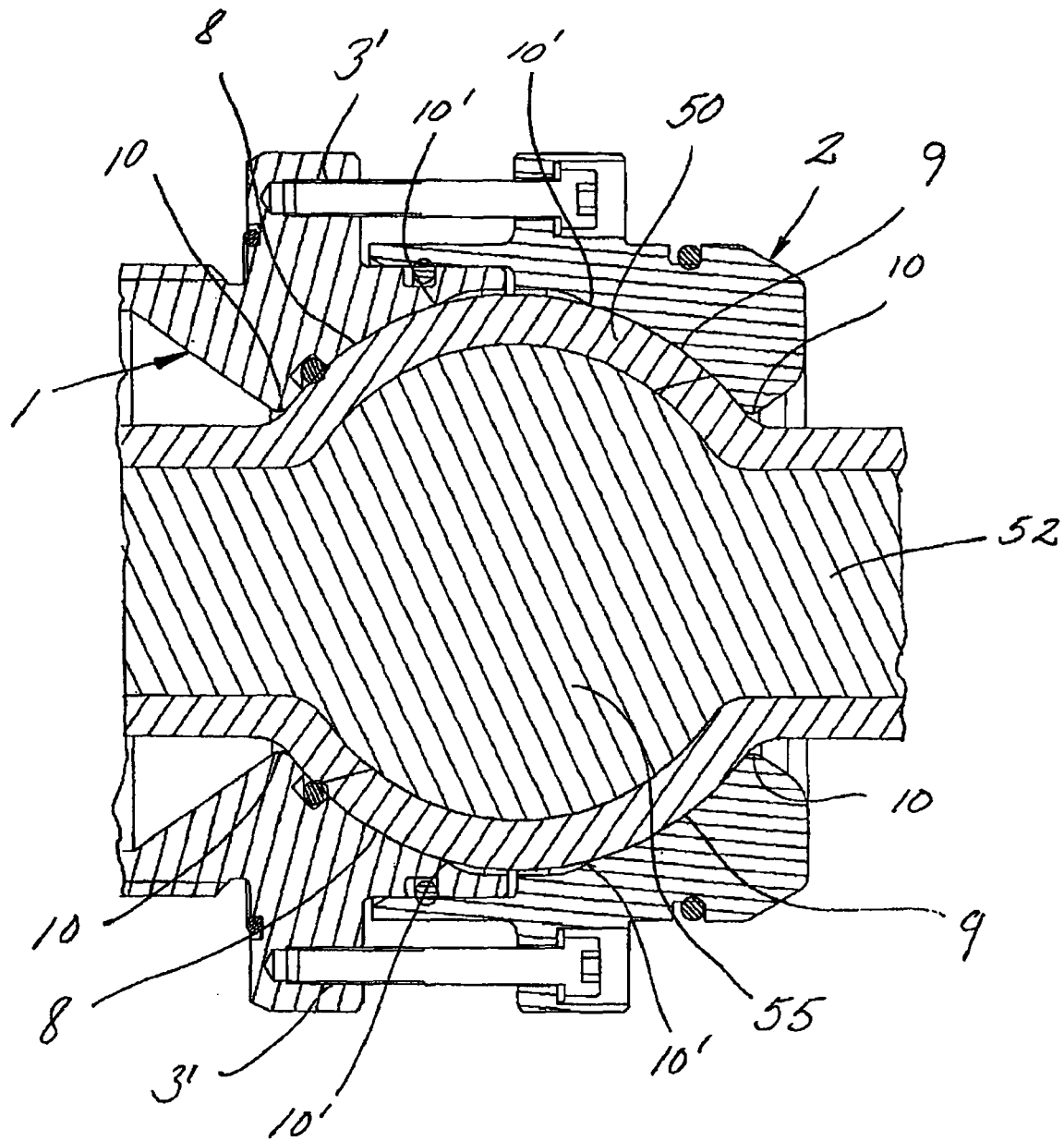
FIG. 2 is a view corresponding to FIG. 1, but on a larger scale.

With reference to FIGS. 1 and 2, the housing of a subsea electrical penetrator according to the present invention comprises a first housing part 1 connectable to a second housing part 2. Connection can be accomplished, e.g., as illustrated in FIG. 1 through a threaded engagement 3 provided through mating threads arranged on the exterior and on the interior of the first and second housing parts respectively. Alternatively, as illustrated in FIG. 2, a threaded connection between the first and second housing parts 1, 2 may be accomplished by means of a bolt connection 3'. A seal element 4, in the form of an O-ring or the like, is advantageously seated at the interface between the first and second housing parts. Upon assembly, the first and second housing parts 1, 2 together define a seat 5 for accommodation of an electrical bushing comprising a conductor pin 52 arranged in an insulator body 50, which will be described more in detail below. Significantly, through the threaded connection 3 or 3', the bushing is clamped upon assembly under a controllable bias from the threaded connection between the first and second housing parts.

The first housing part 1 has a connector end 6 arranged for electrically connecting, via the electrical penetrator, a mating connector (not shown) from an electrical device with a cable conductor that is terminated in the second housing part 2. The first housing part 1 may also comprise means such as bolts or bolt holes 7 for coupling the electrical penetrator to a mating connector device, or to a housing of an electrical device.

The cable termination components which are normally found in subsea electrical penetrators, and which are familiar to a person skilled in the art, are omitted from the drawings and will be only briefly discussed below with reference to FIG. 4. However, it will be realized that in the partly broken away drawing of FIG. 1, the housing part 2 would in practise be extended towards the right hand side of the drawing for accommodation of the cable termination components.

The seat 5 comprises seat surfaces 8 and 9 formed on the interiors of the first and second housing parts 1 and 2 respectively. The seat surfaces 8 and 9 are shaped and dimensioned to provide abutting support for the exterior of the insulator body 50 as the bushing 50, 52 is clamped in the seat 5 upon assembly of the penetrator housing. More specifically, the seat surfaces 8 and 9 are curved with a radius, or more specifically with radii corresponding to the radii included in the outer surface of the insulator body 50, and are thus each provided a semi-spherical or part-spherical shape.

The major penetrator components so far described, i.e. the housing parts 1 and 2, the seat 5 with seat surfaces 8 and 9, and the bushing/insulator body 50, are typically rotationally symmetric in their overall shape and arranged on a common longitudinal axis C.

The part-spherical seat surfaces 8 and 9 are preferably symmetrically arranged about the longitudinal axis C, i.e. equally radially distanced from the longitudinal axis. Preferably, the part-spherical surfaces 8 and 9 are likewise symmetrically arranged about a centre of mass M of the bushing when accommodated in the seat 5, i.e. equally radially and axially distanced from the mass centre. Each seat surface may be limited to the shape of a supporting ring that runs concentrically about the longitudinal axis of the penetrator housing, providing a convex support surface that faces the bushing.

The circular edges which define the areas of contact between the ring-shaped seat surfaces 8, 9 and the bushing are preferably formed with relief regions 10, 10'. The relief may be angled, but is however preferably curved in a sectional view as best illustrated in FIG. 2. In other words, and in the most preferred embodiment, the supporting surfaces 8, 9 on the housing parts 1, 2 connect to non-contact portions of the housing parts through a radius transition which provides a relief by which the contact interference is gradually decreased.

The insulator body 50 is made of dielectric material, carrying an electrically conductive pin 52 which is embedded in the dielectric material through a moulding process. The conductor pin 52 is typically made of copper, copper alloy or other electrically conductive metal. The conductor pin 52 has a conductor pin end 53 projecting through the wall of the insulator body towards the connector end 6 of the electrical penetrator, and an opposite conductor pin end 54 likewise projecting through the wall of the insulator body towards the cable termination end of the electrical penetrator, both ends 53 and 54 coinciding with the longitudinal axis C in the embodiments of FIGS. 1 and 2.

The conductor pin ends 53 and 54 connect to a bulbous portion 55 which is embedded in the insulator body. The bulbous portion 55 may be formed to have a shape corresponding to the shape of the insulator body, and is preferably the downsized outer shape of the insulator body as illustrated in the drawings. The insulator body 50 thus encapsulates the bulbous portion 55 by a surrounding wall 56 substantially of uniform thickness, in preferred embodiments locating the mass centre of the bulbous portion 55 to the centre of mass M of the bushing 50, 52.

Figure 3:
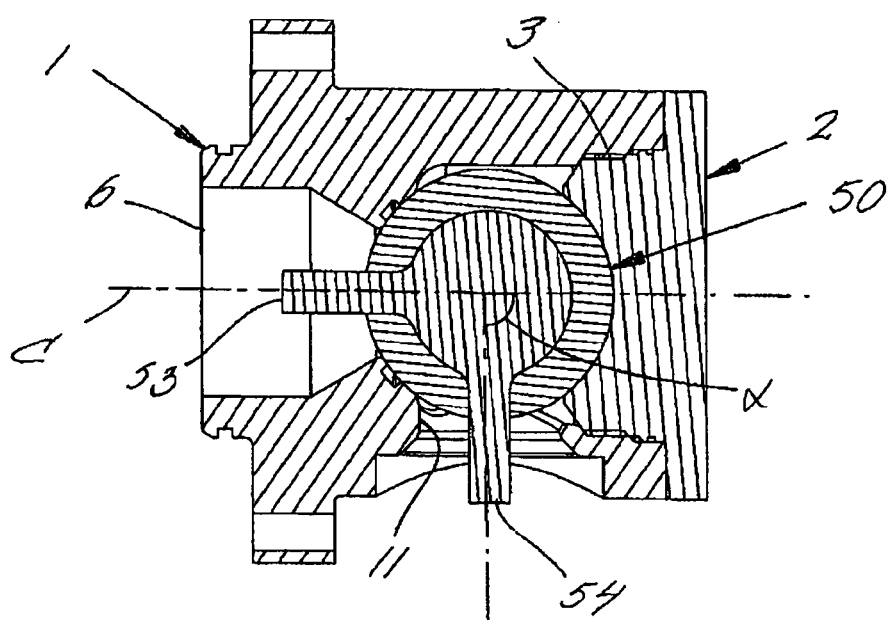
FIG. 3 is a sectional view through a second embodiment of the subsea electrical penetrator and bushing.

The embodiment illustrated in FIG. 3 differs from the previous embodiment through the overall angular configuration applied to the subsea electrical penetrator of FIG. 3. In FIG. 3, a first conductor pin end 53 projects towards the connector end 6 of the penetrator housing and coincident with the longitudinal axis C, whereas a second conductor pin end 54 projects radially at an angle $\alpha$ relative to the longitudinal axis. The second conductor pin end 54 extends towards a cable termination end through a radial passage 11 from the seat 5, the passage 11 mouthing in the wall of the first housing part 1. Means not illustrated may be arranged on the penetrator housing wall for connection to a supplementary housing part accommodating the cable termination components, as is indicated in FIG. 4. Albeit the angled conductor pin end 54 is illustrated in FIG. 3 to project radially at an angle of 90° relative to the longitudinal axis, it will be realized that other angles may be contemplated. In the embodiment of FIG. 3, the second housing part 2 is arranged as an end block connectable to the first housing part through a threaded engagement 3.

Figure 4:
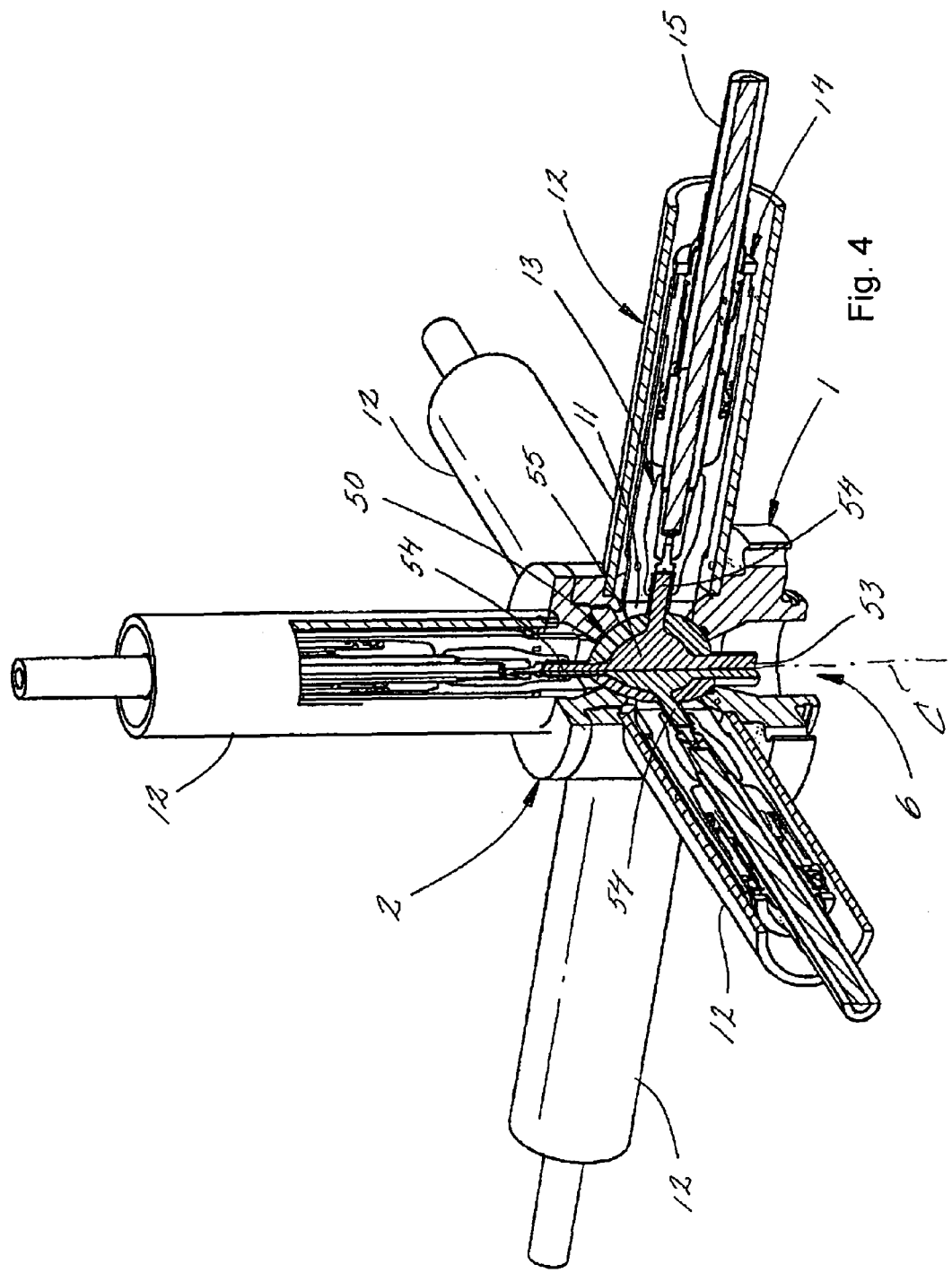
FIG. 4 is a partially sectioned perspective view showing a third embodiment of the subsea electrical penetrator and bushing.

The embodiment illustrated in FIG. 4 is a further development of the previous embodiments, resulting in a subsea electrical penetrator adapted for power distribution to a plurality of power consumers. The embodiment of FIG. 4 comprises the first and second housing parts 1 and 2 substantially as disclosed with reference to FIG. 3, except that the first housing part 1 in a common radial plane comprises four equidistantly spaced passages 11 mouthing in the wall of the housing part 1. Each passage 11 is associated with appropriate coupling means for connection to a supplementary housing part 12 respectively. The supplementary housing parts 12 are arranged for accommodation of cable termination components generally indicated by reference number 13, referring to components such as a cone clamp, a contact ring, a centring piece, a stress cone, a pressure bolt, and other components which are known per se and not further commented on. The cable termination is typically made in a pressure compensated space 14 defined inside one or more barriers towards the ambient, through which barriers a cable conductor 15 extends from the penetrator housing.

In correspondence herewith, the conductor pin comprises four conductor pin ends 54 projecting equidistantly spaced through the passages 11 to be electrically connected with the cable conductors inside the supplementary housing parts 12.

It is further to be observed, that a fifth conductor pin end 54 may be arranged to project from the insulator body 50 through a passage 11 which is formed through the second housing part 2, extending in the longitudinal direction C and opposite from the connector end 6. This way electrical power, which is conducted from a power feed device connecting to the conductor pin end 53 in the connector end of the electrical penetrator, can be distributed via the conductor pin to five external power consumers.

The spherical bushing, comprising the insulator body 50 and conductor pin 52 arranged there through, is preferably manufactured in a moulding process where the conductor pin is embedded in a dielectric material forming a spherical shell about the bulbous portion of the conductor pin. In the subject high voltage applications, a suitable wall thickness of the spherical shell is in the order of about 5-15 mm, preferably at least about 8-12 mm. The combination of an insulator body of spherical outer shape and corresponding part-spherical seats on the housing parts substantially eliminates the generation of tensile stresses in the insulator body. Significantly, except for the conductor pin projecting there through, the insulator body 50 has a continuous spherical outer shape. The strength of the insulator body is therefore governed essentially by the relative high compressive strength and load distribution of the polymeric or ceramic material used to produce the spherical shell about the conductor pin.

Preferred materials for producing the spherical shell are thus ceramics and polymeric materials. Suitable and preferred polymeric materials are thermosetting polymers, such as epoxy or other irreversibly cured polymers, as well as thermoplastic polymers, such as PEEK or other re-mouldable polymers of similar properties. Load tests verify, that embodiments of the spherical bushing as disclosed herein will result in a subsea high voltage electrical penetrator and bushing capable of operation under differential pressures rising towards 1000 bar, while still developing only moderate global stresses in the spherical insulator body.

It will be appreciated from the above, that sealing against the ingress of fluid into the spherical bushing is accomplished, on one hand, through bonding between the inner surface of the spherical shell and the outer surface of the conductor pin, and on the other hand through a non-bonding form fit between the outer surface of the spherical shell and the seat surfaces of the penetrator housing. The spherical bushing thus forms a unitary form-fitting element 50, 52 which is secured in the seat 5 by clamping upon connection of the first and second housing parts 1 and 2.

As an additional measure of security, a seal member 4' may optionally be recessed into one or both seat surfaces 8 and 9.

FURTHER ADVANTAGES AND MODIFICATIONS

From the above it will also be realized that other shapes than a true spherical shape may be applied to the insulator body and/or to the bulbous portion of the conductor pin, while still taking advantage of the invention. The solution taught herein thus includes also other shapes than the true sphere, although preferred, as explained in the initial part of the detailed description. It shall also be pointed out that the insulator body need not be provided a perfectly smooth exterior, but may include some roughness to the surface.

In order to provide a perfect fit between the insulator body and penetrator housing, the seat surfaces and the insulator body may be ground-in together, such as in a rotary grinding procedure, this way optionally avoiding the need for separate sealing elements against the ingress of liquid or gas. Another approach includes the combination of grinding and application of a coating, such as PTFE or silver or the like, to the exterior of the insulator body and/or to the seat surfaces.

Naturally, in a distributor electrical penetrator, it is also possible to arrange the radial conductor pin ends 54 and supplementary housing parts 12 in other positions and other numbers than those disclosed, without departing from the invention as defined in the accompanying claims.

The invention claimed is:

1. A high voltage subsea electrical penetrator, comprising: a first housing part connectable to a second housing part, the first and second housing parts in a connected mode defining a seat for accommodation of a bushing comprising a conductor pin arranged in an insulator body, wherein the first and second housing parts each have a part-spherical seat surface supporting a corresponding region of the bushing in the connected mode, wherein the insulator body comprises a polymeric material or a ceramic material, which is molded into spherical outer shape about a bulbous portion of the conductor pin, whereby the bushing is clamped as a unitary, non-bonding, form-fitting element in the seat upon connection of the first and second housing parts.

2. The electrical penetrator according to claim 1, wherein the first and second housing parts are assembled through a threaded connection, by which the spherical bushing is clamped in the seat under controllable bias from the first and second housing parts.

3. The electrical penetrator according to claim 1, wherein the spherical bushing comprises a continuous spherical wall having a thickness of about 5-15 mm, which is penetrated by the projecting ends of the conductor pin.

4. The electrical penetrator according to claim 1, wherein the shape of the bulbous portion on the conductor pin is the down-sized outer shape of the insulator body.

5. The electrical penetrator according to claim 1, further comprising:
a ring-shaped seal element recessed into the seat surface of the first housing part, and/or into the seat surface of the second housing part.

6. The electrical penetrator according to claim 1, wherein the insulator body is made of epoxy.

7. The electrical penetrator according to claim 1, wherein the insulator body is made of polyetheretherketone.

8. The electrical penetrator according to claim 1, wherein the spherical bushing is ground in situ into a perfect form fit with the seat surfaces of the first and second housing parts through a rotary grinding procedure.

9. The electrical penetrator according to claim 8, further comprising:
a coating applied externally on the spherical bushing, and/or to the seat surfaces.

10. The electrical penetrator according to claim 1, wherein the seat surfaces of the first and second housing parts are ring-shaped, and wherein each circular edge, defining an area of contact between the seat and the spherical bushing, comprises a relief region.

11. The electrical penetrator according to claim 10, wherein said relief region comprises a radius transition between contacting and non-contacting portions of the seat, by which the contact interference between the seat and the spherical bushing is gradually decreased.

12. The electrical penetrator according to claim 1, wherein the outer shape of the spherical bushing is one of an egg-shape, a spheroid, a substantially true sphere, and a true sphere.

13. The electrical penetrator according to claim 12, wherein the shape of the spherical bushing is axially symmetric with respect to a longitudinal axis through the spherical bushing.

14. The electrical penetrator according to claim 13, wherein the seat surfaces on the first and second housing parts, respectively, are symmetrically arranged with respect to the longitudinal axis.

15. The electrical penetrator according to claim 14, wherein the seat surfaces of the first and second housing parts are symmetrically arranged with respect to a mass center of the spherical bushing.

16. The electrical penetrator according to claim 1, wherein two conductor pin ends projecting from the insulator body at mutually opposite directions coincident with the longitudinal axis.

17. The electrical penetrator according to claim 16, wherein at least one conductor pin end projects from the insulator body at an angle relative to the longitudinal axis, while at least one conductor pin end is coincident with the longitudinal axis.

18. The electrical penetrator according to claim 17, wherein a plurality of conductor pin ends project from the insulator body at 90° angle relative to the longitudinal axis.

19. The electrical penetrator according to claim 18, wherein the plurality of conductor pin ends project equidistantly spaced in a common radial plane.

20. The electrical penetrator according to claim 19, wherein one penetrator housing part comprises connections for a corresponding plurality of supplementary housing parts accommodating cable termination components in a distributor subsea penetrator.

* * * * *